United States Patent [19]

Hattan

[11] 3,806,265

[45] Apr. 23, 1974

[54] SELF-LOCKING TURNBUCKLE

[75] Inventor: Mark Hattan, Balboa, Calif.

[73] Assignee: William P. Green, Pasadena, Calif., a part interest

[22] Filed: Feb. 28, 1972

[21] Appl. No.: 229,835

[52] U.S. Cl. ................................. 403/46, 403/320
[51] Int. Cl. ............................. E04g 25/02
[58] Field of Search....... 29/175 R, 175 A; 285/314, 285/340; 287/54, 60, 61; 403/46, 320

[56] References Cited
UNITED STATES PATENTS

| 1,581,109 | 4/1926 | Franke | 287/59 |
| 2,479,096 | 8/1949 | Bratz | 287/60 |
| 2,479,172 | 8/1949 | London | 287/60 |
| 2,484,360 | 10/1949 | Toorans | 287/60 |

FOREIGN PATENTS OR APPLICATIONS

| 498,350 | 12/1953 | Canada | 285/319 |

Primary Examiner—Dave W. Arola
Attorney, Agent, or Firm—William P. Green

[57] ABSTRACT

A turnbuckle including a body structure and two threaded elements connected thereto by right and left-hand threads respectively, and a locking structure having a portion maintained under tension and exerting holding force against at least one and preferably both of the threaded elements by virtue of that tensioned condition.

16 Claims, 10 Drawing Figures

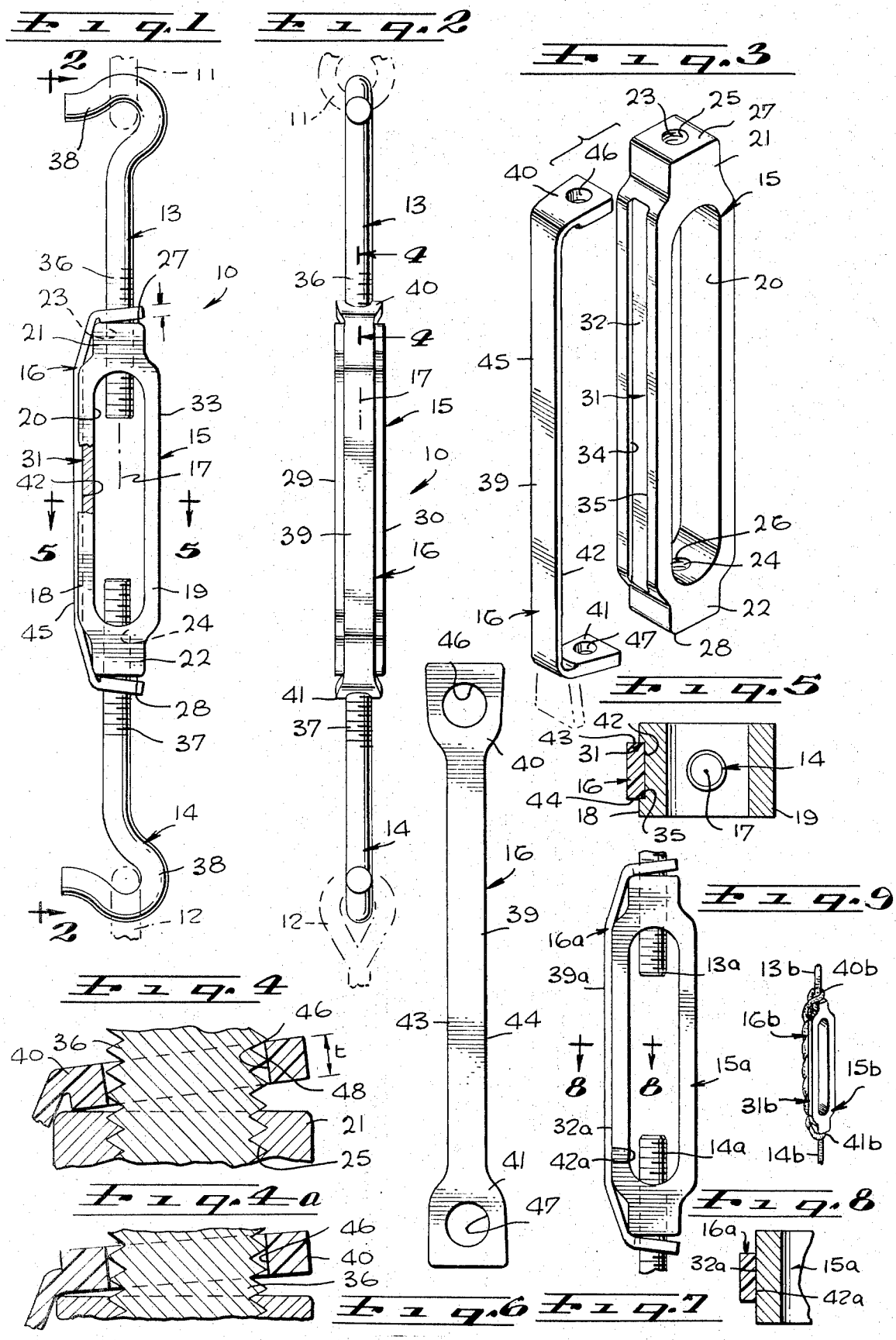

SELF-LOCKING TURNBUCKLE

BACKGROUND OF THE INVENTION

This invention relates to turnbuckles, and particularly to means for rendering a turnbuckle self-locking, to automatically remain in any particular adjusted setting.

In many uses to which turnbuckles are put, the turnbuckle may be subjected to vibrations and other forces in use which tend to gradually loosen the turnbuckle and thereby release the parts or structures which are intended to be retained by it. For example, it is conventional to utilize turnbuckles in the tie-down assemblies for securing a camper in position on a truck bed, and yet the continual vibration to which such turnbuckles are subjected inevitably results in gradual and repeated loosening of the turnbuckles, with consequent danger of disconnection of the camper from the truck. As a result, persons owning campers find it necessary to very frequently check and retighten their turnbuckles, in order to assure effective retention of the camper on the truck. Similarly, in various types of marine installations employing turnbuckles, as for instance in guy-wire assemblies for masts, the conditions encountered in use may tend to very rapidly loosen the turnbuckles. To combat this condition some types of turnbuckles have been provided with jam nuts on their threaded elements, adapted to be tightened against the bodies of the turnbuckles to retain the threads in set position. However, the tightening of these jam nuts necessarily involves the expenditure of extra time and effort in setting the turnbuckle, and is generally very inconvenient to the user.

SUMMARY OF THE INVENTION

The present invention provides an improved locking structure for a turnbuckle, which structure automatically resists unscrewing rotation of the turnbuckle body relative to the right and left-hand threaded elements to which it is connected, and thereby locks the turnbuckle in any desired set position. This result is attained without the necessity for extra manipulative steps in setting or locking the turnbuckle, as is required for example in the above discussed jam nut arrangement.

Structurally, these results are achieved by provision of a locking structure having a portion which is slightly elastically stretchable, and is maintained under tension, with this tensional force then being exerted against one of the threaded screws or elements of the turnbuckle in a manner resisting its rotation relative to the body of the turnbuckle. Preferably, both of the two oppositely threaded elements of the turnbuckle are restrained against rotation in this manner, by a common locking structure or strap whose opposite ends exert locking force against the two threaded elements respectively. This strap may extend along a side of the turnbuckle body, and engage it in a relation retaining the locking structure against relative rotation, preferably by reception of the strap within an elongated groove formed in the body. Optimally, this entire locking structure is formed as a single piece of elastically stretchable resinous plastic material, preferably nylon.

BRIEF DESCRIPTION OF THE DRAWING

The above and other features and objects of the invention will be better understood from the following detailed description of the typical embodiments illustrated in the accompanying drawing, in which:

FIG. 1 is a side view, partially broken away, of a first form of self-locking turnbuckle embodying the invention;

FIG. 2 is a view taken on line 2—2 of FIG. 1;

FIG. 3 is an exploded perspective view of the turnbuckle body and locking strap;

FIG. 4 is an enlarged axial section taken on line 4—4 of FIG. 2;

FIG. 4a corresponds to a portion of FIG. 4, with the locking element reversed;

FIG. 5 is an enlarged transverse section taken on line 5—5 of FIG. 1;

FIG. 6 shows the locking strap or structure of the invention in flattened form and in the condition in which it is first molded;

FIG. 7 is a view similar to FIG. 1, but showing a variational form of the invention;

FIG. 8 is an enlarged transverse section taken on line 8—8 of FIG. 7; and

FIG. 9 is a perspective view of another variational form of the invention.

DESCRIPTION OF THE PREFERRED EMBODIMENTS

Describing first the form of the invention shown in FIGS. 1 through 6, and with particular reference to FIG. 1, I have shown at 10 a turnbuckle which is to be utilized for connecting together two elements or parts diagrammatically represented at 11 and 12, which parts may typically be two cables, wires, chains, or the like, having loops or eyes at their ends as illustrated adapted to be connected to the oppositely projecting threaded elements 13 and 14 of the turnbuckle. Elements 13 and 14 are adjustably connected to a turnbuckle body 15, and are frictionally retained or locked in any desired setting relative to body 15 by a locking element or structure 16 with which the present invention is particularly concerned.

The turntable body 15 may have the essentially conventional configuration illustrated in the figures, being elongated in the direction of the longitudinal axis 17 of the turnbuckle, and having the cross-sectional configuration illustrated in FIG. 1. More particularly, this cross section is such as to define two similar parallel elongated side portions 18 and 19 of the body, extending parallel to and spaced equally in opposite directions from axis 17, to define opposite sides of a central elongated oval shaped opening 20 in the body. At the opposite ends of this opening 20, the turnbuckle body 15 has two portions 21 and 22 containing aligned passages 23 and 24 within which internal threads 25 and 26 are formed. These screw threads 25 and 26 are both centered about the axis 17, and may be of a common diameter, but differ in that one of the threads, say for example the upper thread 25 in FIG. 1, is a right-hand thread, while the other thread (say for example the lower thread 26 in FIG. 1) is a left-hand thread. The width of end portions 21 and 22 of body 15 may be somewhat reduced as compared with the external width of the body at the locations of portions 18 and 19, as seen in FIG. 1, and the opposite end surfaces or faces 27 and 28 of body 15 may be parallel to one another and planar and be disposed transversely of axis 17.

Referring now to FIG. 2, the body 15 as viewed in that figure may have two parallel planar opposite side surfaces 29 and 30, extending parallel to and spaced equally from axis 17. The cross section of body 15 in planes parallel to these surfaces 29 and 30 will be apparent from the above discussion of FIG. 1, and is the same in all planes between surfaces 29 and 30 except insofar as that cross section is interrupted by the discussed threads 25 and 26 and by an elongated groove 31 formed in an outer side of portion 18 of the body. That groove extends parallel to axis 17, and more particularly may have an inner elongated planar wall 32 lying in a plane which is perpendicular to the planes of surfaces 29 and 30 and is parallel to an opposite side surface 33 of the body. Groove 31 is cut into the material of portion 18 of the body, with parallel side walls 34 and 35 defining the width of the groove. As will be apparent, body 15 may easily be formed as an extrusion of aluminum or other metal or material, with the extrusion die being shaped to give the body its ultimate configuration except for the requirement that threaded openings 23 and 24 and groove 31 be machined on the extruded element.

Threaded elements 13 and 14 are connectible into the threaded passages 23 and 24 of body 15, in the relation illustrated in FIGS. 1 and 2, and for that purpose each of these elements may have external threads represented at 36 and 37, one of right-handed configuration and the other of left-handed configuration, to threadedly engage the correspondingly right-hand and left-hand threads of passages 23 and 24. The ends 38 of elements 13 and 14 may be of any desired shape to properly connect to parts 11 and 12, that is, they may be hook shaped as shown, or formed as eyes, or take any other configuration desired for connection to the parts 11 and 12.

The locking device or structure 16 may in some instances be formed of two or more interconnected elements, but is preferably made as a single molded body of a material which is capable of being stretched longitudinally very slightly, and is elastic to yieldingly and resiliently resist such longitudinal stretching. For example, the element 16 may be formed of an appropriate slightly stretchable and elastic resinous plastic material, optimally nylon having an appropriate cross section to take the required forces without stretching beyond its elastic limit. The nylon may initially be molded to the peripheral outline configuration illustrated in FIG. 6, to form an elongated slightly stretchable strap portion 39 of locking element 16 having two end portions 40 and 41 for connection to elements 13 and 14 respectively. More particularly, strap portion 39 may form essentially an elongated fairly thin strip of the nylon having a cross-sectional configuration transversely of axis 17 enabling it to fit partially and very closely within groove or recess 31 in body 15 as seen clearly in FIG. 5. At its inner side, strap portion 39 of element 16 may have a planar surface 42 engaging surface 32 of groove 31, with two parallel opposite side surfaces 43 and 44 engaging and being located by the opposite side walls 34 and 35 of the groove to effectively locate strap portion 39 in the groove. Outer surface 45 of the strap portion may be parallel to inner surface 42.

The end portions 40 and 41 of locking element 16 may have increased width as compared with portion 39 (FIG. 6), and also may have increased thickness $t$, as seen in FIGS. 1 and 4. Openings or passages are formed through these portions 40 and 41 at 46 and 47. These passages may be circular and have cylindrical side walls as seen in FIG. 4, of a diameter just slightly greater than the external diameter of threads 36 and 37 on elements 13 and 14, to receive those threads fairly closely. In the FIG. 1 assembled condition of the turnbuckle, portions 40 and 41 are turned into generally parallel but slightly cocked relation with respect to end faces 27 and 28 of body 15, with elements 13 and 14 extending through the openings.

In using the turnbuckle of FIGS. 1 to 6, the threaded screws or hooks 13 and 14 are connected to elements 11 and 12 as shown, and body 15 is then turned about axis 17 relative to elements 13 and 14 in a direction causing advancement of elements 13 and 14 toward one another, to exert a tight pulling force on the connected parts 11 and 12. The locking element 16 exerts a frictional holding force on both of the elements 13 and 14 resisting such rotation of body 15 relative thereto, to frictionally retain the turnbuckle at any desired set condition. For this purpose, the spacing between openings 46 and 47 in element 16 is just small enough to require a small amount of stretching of strap portion 39 of element 16 longitudinally, in order to permit both of the elements 13 and 14 to extend through openings 46 and 47 at the same time. The resilience or elasticity of element 16 resists such stretching, and therefore causes portion 39 of element 16 to exert a leftward and downward force on portion 40, and a leftward and upward force on portion 41. This in turn causes the wall of opening 46 to be pulled tightly laterally against external thread 36 of element 13 at 48 in FIG. 4, and causes a similar exertion of leftward force against the right side of thread 37 by portion 41 at the lower end of body 15. These forces are exerted continually against threads 36 and 37 at all times, and in all settings of elements 13 and 14, to produce an automatic self-locking action frictionally retaining elements 13 and 14 in any desired setting relative to body 15. The thickness $t$ of portions 40 and 41 is sufficiently great to prevent substantial deformation of those portions under the forces exerted against elements 13 and 14 in use, while the thinner connecting strap portion 39 of element 16 can more readily deform or stretch to the desired tensioned condition maintaining the automatic lock on the screw elements (but without ever reaching the elastic limit of the nylon, as previously indicated).

The engagement of connecting strap portion 39 of element 16 within the walls of groove 31 acts to effectively retain locking element 16 against rotation about axis 17 relative to body 15, to assure an effective locking action.

FIGS. 7 and 8 show a variational form of the invention which may be considered as identical to that of FIGS. 1 to 6 except that the elongated connecting strap portion 39a of locking element 16a is not received within a groove in the side of rigid body 15a, but rather merely engages a planar side surface 32a of that body. As in FIGS. 1 to 6, strap 39a is maintained in a longitudinally tensioned condition, to lock elements 13a and 14a against rotation relative to body 15a, with the interengagement of flat planar surfaces 42a and 32a on the strap and body serving to prevent rotation of element 16a relative to body 15a even without the presence of a groove in the body.

FIG. 9 is a perspective representation of another variational form of the invention, which may be considered the same as that of FIGS. 1 to 6 except for the substitution of a changed type of nylon locking element 16b in lieu of the element 16 of the first form of the invention.

In FIG. 9, this element 16b may be formed of nylon or other slightly elastically stretchable material shaped to the configuration of a simple O-ring or endless loop, and dimensioned so that it can be positioned within groove 31b of body 15b in stretched form, and can then form at its opposite ends two loops 40b and 41b extending about and frictionally engaging the threaded shanks of elements 13b and 14b respectively. The portion of element 16b within groove 31b may be twisted through just enough turns to require the looped ends 40b and 41b to exert force laterally against elements 13b and 14b as a result of the longitudinally tensioned condition of the twisted portion of element 16b, in a manner analogous to the manner in which portions 40 and 41 of element 16 exert locking force against elements 13 and 14 of FIG. 1.

FIG. 4a is a view similar to FIG. 4, showing the manner in which locking element or strap 16 can if desired be reversed in position, to a condition in which the points of connection of strap portion 39 to the thicker end portions 40 and 41 of element 16 are directly adjacent the ends of the turnbuckle body 15, rather than being spaced outwardly therefrom as in FIG. 4. As will be apparent, for a given length of element 16 this FIG. 4a arrangement will exert a reduced locking force on the threaded elements 13 and 14 as compared with the FIG. 4 arrangement. It is therefore contemplated that, if desired, the device may initially be sold to the public in the FIG. 4a condition, so that if at any time the nylon should stretch enough to excessively reduce the self-locking action, the user can merely reverse the element 16 to the FIG. 4 condition to restore the original locking effect.

While certain specific embodiments of the present invention have been disclosed as typical, the invention is of course not limited to these particular forms, but rather is applicable broadly to all such variations as fall within the scope of the appended claims.

I claim:

1. A turnbuckle comprising a body structure, two oppositely directed elements to be connected to two parts which are to be joined adjustably by the turnbuckle, said two elements having righthand and lefthand threads respectively which are threadedly connected to said body structure to pull said elements generally toward one another in response to rotation of the body structure, and a locking structure having a first portion extending at least partially about one of said threaded elements, and having a second portion which is connected at spaced locations respectively to said first portion and to another part of the turnbuckle, in a relation maintaining said second portion under tension and exerting pulling force on said first portion urging it laterally against said one element, and thereby resisting unscrewing rotation of said one element relative to the body structure, said first portion being connected to said second portion at essentially a first side of said one threaded element and being in engagement with and urged against the opposite side of said one element by said tension and pulling force.

2. A turnbuckle as recited in claim 1, in which said first portion of the locking structure contacts said thread of said one element and is urged thereagainst in frictional holding relation by said pulling force.

3. A turnbuckle as recited in claim 1, in which said locking structure is formed of nylon.

4. A turnbuckle as recited in claim 1, in which said locking structure engages said body structure in a relation preventing rotation of the locking structure relative to the body structure about the axis of the thread of said one element.

5. A turnbuckle as recited in claim 1, in which said body structure has a groove formed along one of its sides and at least partially receiving said second portion of said locking structure.

6. A turnbuckle comprising a body structure; two generally oppositely directed threaded elements to be connected to parts which are to be joined adjustably by the turnbuckle; a first of said threaded elements having righthand threads connected to said body structure; the second of said elements having lefthand threads connected to said body structure so that the two elements are pulled relatively together by rotation of the body structure; and a locking structure having a first portion extending at least partially about one of said threaded elements, a second portion extending at least partially about the other of said threaded elements, and an interconnecting third portion connected at spaced locations to said first and second portions respectively and maintained under tension, by engagement of said first and second portions with said threaded elements, in a relation exerting pulling forces on both of said first and second portions in directions urging them laterally against said first and second threaded elements respectively and thereby resisting rotation of said threaded elements relative to the body structure, each of said first and second portions being connected to said third portion at one side of a corresponding one of said threaded elements and having a portion urged against the opposite side of said corresponding element by said tension and pulling force.

7. A turnbuckle as recited in claim 6, in which said interconnecting third portion of the locking structure is formed of a slightly stretchable slightly elastic resinous plastic material.

8. A turnbuckle as recited in claim 6, in which said interconnecting third portion of the locking structure is formed of nylon.

9. A turnbuckle as recited in claim 6, in which said locking structure engages said body structure in a relation preventing rotation of the locking structure relative to the body structure.

10. A turnbuckle as recited in claim 6, in which said locking structure is formed as a single elongated piece of slightly elasticly stretchable nylon in which said third portion forms a strap extending along a side of said body structure with said first and second portions at opposite ends thereof and thicker than said strap and containing openings within which said threads of said elements are received.

11. A turnbuckle as recited in claim 6, in which said body structure is elongated and has a groove extending along a side thereof receiving said interconnecting third portion of the locking structure.

12. A turnbuckle as recited in claim 6, in which said body structure has an essentially flat surface along one of its sides, and said interconnecting third portion of the locking structure forms a strap having an essentially flat surface engaging said flat surface on the locking structure in a relation preventing rotation of the locking structure relative to the body structure.

13. A turnbuckle as recited in claim 6, in which said body structure is elongated and has essentially axially aligned threads at opposite ends engaging said right and lefthand threads respectively of said elements, said body structure having oppositely facing end surfaces through which said two threaded elements respectively extend, said locking structure being formed as an elongated piece of slightly elastically stretchable nylon in which said third portion thereof forms an elongated strap extending along and engaging a side surface of said body structure in a relation preventing rotation of said locking structure about the axis of the threads, said first and second portions of the locking structure being formed as ends of said piece of nylon urged against said end surfaces respectively of the body structure by the resilience of the nylon strap and containing openings through which said right and lefthand threads of said two elements respectively extend, with said threads in frictional contact with the walls of said openings.

14. A turnbuckle as recited in claim 13, in which said body structure contains an elongated groove extending along one side thereof generally parallel to the axis of said threads and at least partially receiving said strap portion of the nylon locking structure.

15. A turnbuckle as recited in claim 6, in which each of said first and second portions has two surfaces facing generally in opposite axial directions and which selectively bear against said body in two different relatively reversed positions of said element, said third portion being connected to at least one of said first and second portions at a location closer to one of said surfaces thereof than to the other surface, in a relation causing a change in the locking force exerted against said threaded elements upon reversal of the locking element.

16. For use with a turnbuckle having a body structure and two threaded elements with right and left hand threads respectively connected to the body structure: a locking structure having a first portion containing an opening for receiving one of said threaded elements with said first portion extending thereabout, said locking structure having a second portion containing an opening for receiving the other of said threaded elements and adapted to extend thereabout, said locking structure having an interconnected third portion flexibly connected at spaced locations to said first and second portions respectively and adapted to be maintained under tension, by engagement of said first and second portions with said threaded elements, in a relation exerting pulling forces on both of said first and second portions in directions urging them laterally against said threaded elements respectively and thereby resisting rotation of said threaded elements relative to the body structure, at least one of said first and second portions being thicker than an adjacent end of said third portion and having two surfaces at opposite sides which face generally in opposite directions and selectively bear against said body in two different relatively reversed positions of said element, said thicker portion being connected to said adjacent end of said third portion non-symmetrically so that one side of said thicker portion projects farther laterally relative to said adjacent end of said third portion than does the opposite side, thereby causing a change in the locking force exerted against said threaded elements upon reversal of the locking element.

* * * * *